United States Patent
Kato et al.

(10) Patent No.: US 7,058,226 B2
(45) Date of Patent: Jun. 6, 2006

(54) MAKE-UP COLOR IMAGE CLASSIFICATION SYSTEM AND MAKE-UP COLOR IMAGE MAP

(75) Inventors: Midoriko Kato, Tokyo (JP); Kunihiro Ikeuchi, Tokyo (JP); Hiroshi Tanaka, Tokyo (JP); Keiko Sunakawa, Tokyo (JP)

(73) Assignee: Shiseido Company, Ltd., Tokyo (JP)

( * ) Notice: Subject to any disclaimer, the term of this patent is extended or adjusted under 35 U.S.C. 154(b) by 453 days.

(21) Appl. No.: 10/009,887

(22) PCT Filed: Apr. 12, 2001

(86) PCT No.: PCT/JP01/03162

§ 371 (c)(1),
(2), (4) Date: Dec. 11, 2001

(87) PCT Pub. No.: WO01/78553

PCT Pub. Date: Oct. 25, 2001

(65) Prior Publication Data

US 2003/0007684 A1    Jan. 9, 2003

(30) Foreign Application Priority Data

Apr. 13, 2000   (JP)   ............... 2000-112667

(51) Int. Cl.
*G06K 9/62*   (2006.01)
(52) U.S. Cl. ............... 382/224; 382/165; 434/100
(58) Field of Classification Search ............... 382/165, 382/224, 225, 228; 132/317, 333; 434/99, 434/100
See application file for complete search history.

(56) References Cited

U.S. PATENT DOCUMENTS

| | | | |
|---|---|---|---|
| 5,924,426 A | | 7/1999 | Galazin |
| 6,000,407 A | * | 12/1999 | Galazin ............... 132/200 |
| 6,045,783 A | * | 4/2000 | Macchio et al. ............... 424/64 |
| 6,091,836 A | | 7/2000 | Takano et al. |
| 6,132,743 A | * | 10/2000 | Kuroda et al. ............... 424/401 |

FOREIGN PATENT DOCUMENTS

| | | | |
|---|---|---|---|
| EP | 0828230 | | 3/1998 |
| EP | 828230 A2 | * | 3/1998 |
| JP | 08062201 A | * | 3/1996 |
| JP | 10075823 A | | 3/1998 |

OTHER PUBLICATIONS

Y. Takemae et al., "The Evaluating System on Human Skin Surface Condition by Image Processing," 2000 IEEE Conf. On Systems, Man, Cybernetics, V.1, Oct. 8-11, 2000, pp. 218-223.*

* cited by examiner

*Primary Examiner*—Jingge Wu
*Assistant Examiner*—Yubin Hung
(74) *Attorney, Agent, or Firm*—Ladas & Parry LLP

(57) ABSTRACT

The present invention comprehensively acquires a make-up color image and provides a make-up color image classification method and make-up color image map that enables make-up to be applied effectively. A color image index indicating warm/cool and a color image index indicating light/heavy are formed as two coordinate axes and the colors located therealong, the make-up color image is classified and a make-up color image map produced, making it possible to achieve a make-up color image accurately and easily.

6 Claims, 14 Drawing Sheets

FIG.2 (PRIOR ART)

RELATION BETWEEN COLOR AND EMOTION

| ATTRIBUTES | | EMOTIONAL CHARACTER | COLOR EXAMPLES | EXAMPLE OF EMOTION |
|---|---|---|---|---|
| TONE | WARM COLOR | WARM POSITIVE ACTIVE | RED | PASSION, ANGER, DELIGHT, ACTIVITY, EXCITEMENT |
| | | | YELLOW-RED | HAPPINESS, JOY, VITALITY, HEALTH |
| | | | YELLOW | LIVELY, CHEERFUL, HAPPY, ENERGETIC, HEALTHY |
| | NEUTRAL COLOR | MODERATE QUIET ORDINARY | GREEN | CALM, RELAXED, SERENE, YOUTHFUL |
| | | | PURPLE | SOLEMN, ELEGANT, MYSTERIOUS, RESTLESS, GENTLENESS |
| | COOL COLOR | COOL RESERVED PASSIVE | BLUE-GREEN | REPOSE, COOLNESS, GLOOM |
| | | | BLUE | CALM, STILLNESS, SORROW, PROFUNDITY, TRANQUILITY |
| | | | BLUE-VIOLET | MYSTERIOUS, SUBLIME, SOLITARY |
| BRIGHTNESS | LIGHT | POSITIVE BRIGHT | WHITE | PURE, FRESH |
| | MEDIUM | CALM | GRAY | CALM, COLLECTED |
| | DARK | NEGATIVE HEAVY | BLACK | GLOOMY, ANXIOUS, SOLEMN |
| INTENSITY | HIGH | FRESH VIVACIOUS | VERMILION | ARDENT, INTENSE, PASSIONATE |
| | MEDIUM | RELAXED MILD | PINK | CUTENESS, GENTLENESS |
| | LOW | QUIET GOOD TASTE CALMNESS | BROWN | CALMNESS |

THREE-DIMENSIONAL COLOR OBJECT
BASED ON MAPPING ONTO THREE AXIS
(SOURCE : NIHON SHIKISAI HEN)

FIG.6

LIP COLOR TEST COLOR

|  | VI | RS | PK | RD | BL BR | YE BR | OR | YE | GY |
|---|---|---|---|---|---|---|---|---|---|
| PALE P | ◯ | ◯ | ◯ | ◯ | ◯ | ◯ | ◯ | ◯ | — |
| MODERATE M | ◯ | ◯ | ◯ | ◯ | ◯ | ◯ | ◯ | — | ◯ |
| VIVID V | ◯ | ◯ | ◯ | BL RD ◯ / BL YE RD ◯ | — | — | ◯ | — | — |
| DEEP D | ◯ | ◯ | ◯ | ◯ | ◯ | ◯ | — | — | — |

FIG.7

EYE COLOR TEST COLOR

| | BL GR | BL | VI | PK | OR | YE | YE GR |
|---|---|---|---|---|---|---|---|
| | | 👁 | | 👁 | | | |
| DEEP D | 👁 | 👁 | 👁 | 👁 | 👁 | 👁 | 👁 |

| | BL BR | RED BR | BR | YE BR | MN |
|---|---|---|---|---|---|
| VERY LIGHT LL | | | 👁 | | 👁 |
| LIGHT L | | | 👁 | | 👁 |
| MODERATE M | | 👁 | 👁 | 👁 | |
| DEEP D | | | 👁 | | 👁 |

FIG.8

SURVEY CHART

| | THINK SO | SORT OF THINK SO | DON'T THINK SO |
|---|---|---|---|
| ■ WOMANLY | | | |
| ■ SHARP | | | |
| ■ SOFT | | | |
| ■ CLEAN | | | |
| ■ CHEERFUL | | | |
| ■ CALM | | | |
| ■ COOL | | | |
| ■ GENTLE | | | |
| ■ FRESH | | | |
| ■ CUTE | | | |
| ■ INTELLIGENT | | | |
| ■ YOUTHFUL | | | |
| ■ FEMININE | | | |
| ■ SWEET | | | |
| ■ VIBRANT | | | |
| ■ ACTIVE | | | |
| ■ BEAUTIFUL | | | |
| ■ WELL-MATCHED | | | |
| ■ ATTRACTIVE | | | |
| ■ LOUD | | | |
| ■ UNIQUE | | | |
| ■ LIKE | | | |

MAKE-UP COLOR IMAGE CLASSIFICATION SYSTEM AND MAKE-UP COLOR IMAGE MAP

TECHNICAL FIELD

The present invention relates to a make-up color image classification system for classifying color images obtained from applying make-up to the face, that is, applying color to the skin, and a make-up color image map that expresses in map form a make-up color image.

BACKGROUND ART

In making up the face, people usually rely on experience and perception. However, when it comes to making up one's own face, it is not always easy to express the image one wants. Also, when making up another's face to achieve a certain image, the infinite variety of attainable faces requires that the make-up artist have considerable experience and skill in order to apply make-up the way each and every individual wants.

There have been attempts to describe logically the process of applying make-up.

Thus, for example, a process of applying make-up while considering the image projected by the type of face has long been carried out. This involves the application of the aesthetic rules governing the plastic arts. However, when applied to make-up, even if the desired image can be obtained partially there is no guarantee that with such an approach the face, when looked at as a whole, can obtain a well-balanced image.

Concerning this method for applying make-up while considering the image projected by the type of face, the present applicant has previously proposed a facial classification method and facial map (see Japanese Laid-Open Patent Application No. 10-75823).

This facial classification method and facial map, as shown in FIG. 1, classifies faces by locating the face to be classified along coordinate axes comprising a balance axis, which shows the length of the face as well as the positioning of such facial features as the eyes, eyebrows and so forth, and a form axis, which shows the roundness of the face as well as the aforementioned facial features. Additionally, this facial classification method and facial map creates a map from the set of coordinates.

This facial classification method and facial map makes it possible to get an overall picture of the face and clarify scientifically the factors that bring out the image of the face, and based on that, to apply make-up effectively.

Similarly, for example, applying make-up while taking into consideration a color image has long been carried out. This involves the application of the aesthetic rules governing color, and thus, for example, is based on an average perception of the relation between individual-colors and emotions as shown in FIG. 2. In this case, too, as with the type of face, even if the desired image can be obtained partially, there is no guarantee that with such an approach the face, when looked at as a whole, can obtain a well-balanced image. It should be noted that, although chromatics knows of a three-dimensional color object based on mapping three color sense perception attributes onto three axes as shown in FIG. 3, there is no example of multi-dimensionally obtaining a color image from this three-dimensional color object and making use of it in the application of make-up.

In short, as described above, a method of applying make-up while taking into consideration the color image is not necessarily an effective technique.

DISCLOSURE OF THE INVENTION

The present invention, which was conceived in view of these points, has as its object to provide a make-up color image classification method and make-up color image map based not on chromatics, which deals purely with color, but on a view of the total make-up color image projected by a face on which color is applied to skin, enabling the application of make-up to be performed effectively.

In order to achieve this objective, the make-up color image classification method according to the present invention classifies at least one or the other of either a lip color or an eye color using a color image index chosen from among, and indicating at least one of, warm/cool, character, mind as well as a color image index chosen from among, and indicating at least one of, light/dignified, mature/immature, mature, obtained from applying color to skin, while at this time taking as coordinate axes and classifying two-dimensionally the color image index chosen from among and indicating at least one of warm/cool, character, mind and the color image index chosen from among and indicating at least one of light/dignified, mature/immature, mature. It should be noted that, in classifying the latter by mapping onto a two-dimensional set of coordinates, the warm/cool axis and light/dignified axis, the character axis and mature/immature axis, the mind axis and mature axis, correspond respectively thereto.

Additionally, the make-up color image classification method according to the present invention comprises an image index setting step for setting either an image index chosen from among and indicating at least one of warm/cool, character and mind or an image index chosen from among and indicating at least one of light/dignified, mature/immature and mature; a made-up face data acquisition step for acquiring made-up face data for a plurality of types of make-up material for at least one of lip color and eye color applied to a face; a make-up color image evaluation step, in which a plurality of test subjects evaluate a color image of the make-up material based on the made-up face data using the image index as an evaluation criteria; and a make-up color image classification step for classifying the make-up material based on the obtained make-up material color image using the image index.

Additionally, the make-up color image classification method according to the present invention is a make-up color image classification method comprising an image index setting step for setting an image index chosen from among and indicating at least one of warm/cool, character and mind or chosen from among and indicating at least one of light/dignified, mature/immature and mature as two coordinate axes; a made-up face data acquisition step for acquiring made-up face data for a plurality of types of make-up material for at least one of lip color and eye color applied to a face; a make-up color image evaluation step, in which a plurality of test subjects evaluate a color image of the make-up material based on the made-up face data using the two image indexes as an evaluation criteria; and a make-up color image classification step for two-dimensionally classifying the make-up material based on the obtained make-up material color image using the two image indexes as coordinate axes.

Additionally, the make-up color image classification method according to the present invention is a make-up color image classification method for classifying make-up material based on color image data collected and analyzed using a computer, comprising an image index display step for setting, inputting and displaying either an image index chosen from among and indicating at least one of warm/cool, character and mind or an image index chosen from among and indicating at least one of light/dignified, mature/immature and mature; a made-up face data display step for inputting and displaying made-up face data for a plurality of types of make-up material for at least one of lip color and eye color applied to a face; a make-up color image evaluation input step for evaluating a color image of the make-up material based on the made-up face data using the image index as an evaluation criteria and inputting grading data; a make-up color image evaluation data totaling step for adding up grading data input by a plurality of people; and a make-up color image classification data output step for statistically processing the totaled grading data and outputting results of a positioning of a plurality of types of make-up materials in relation to an image index.

Additionally, the make-up color image classification method according to the present invention is a make-up color image classification method for classifying make-up material based on color image data collected and analyzed using a computer, comprising an image index display step for setting, inputting and displaying an image index chosen from among and indicating at least one of warm/cool, character and mind as well as an image index chosen from among and indicating at least one of light/dignified, mature/immature and mature; a made-up face data display step for inputting and displaying made-up face data for a plurality of types of make-up material for at least one of lip color and eye color applied to a face; a make-up color image coordinate plane data input step for evaluating a color image of the make-up material based on the made-up face data using the image index as an evaluation criteria and inputting coordinates; a make-up color image coordinate plane data totaling step for adding up grading data input by a plurality of people; and a make-up color image classification data output step for statistically processing the totaled coordinate point data and outputting a coordinate plane map indicating a position of a plurality of types of make-up materials.

According to the above-described composition of the present invention, color image data can be systematically and multifacetedly analyzed and classified, enabling the application of make-up to be performed effectively.

Additionally, the make-up color image map according to the present invention two-dimensionally classifies, positions and displays at least one of either a lip color or an eye color using a color image index chosen from among, and indicating at least one of, warm/cool, character, mind as well as a color image index chosen from among, and indicating at least one of, light/dignified, mature/immature, mature, obtained from applying color to skin as coordinate axes. Additionally, at this time, each quadrant created by the coordinate axes is provided therein with a written description of the color image that is representative of the respective quadrant.

According to the above-described composition of the present invention, the color image can be grasped easily and accurately, enabling the application of make-up to be performed effectively.

BRIEF DESCRIPTION OF THE DRAWINGS

FIG. 2 is a chart showing an example of the conventional understanding of the relation between color and image.

FIG. 6 is a lip color chart used in experiments in the make-up color image classification method, according to an embodiment of the present invention.

FIG. 7 is an eye color chart used in experiments in the make-up color image classification method, according to an embodiment of the present invention.

FIG. 8 is a survey chart showing the evaluation criteria used in the make-up color image classification method according to one embodiment of the present invention.

BEST EMBODIMENT FOR PRACTICING THE INVENTION

A description will be given below of preferred embodiments of the make-up color image classification method and make-up color image map according to the present invention (hereinafter embodiments of the present invention), with reference to the drawings.

First, a description will be given below of the make-up color image classification method.

Lip color and eye color were used as cosmetic make-up for making up an image of a face. In order to make distinct each color image, the following experiments were performed.

Figure 1:
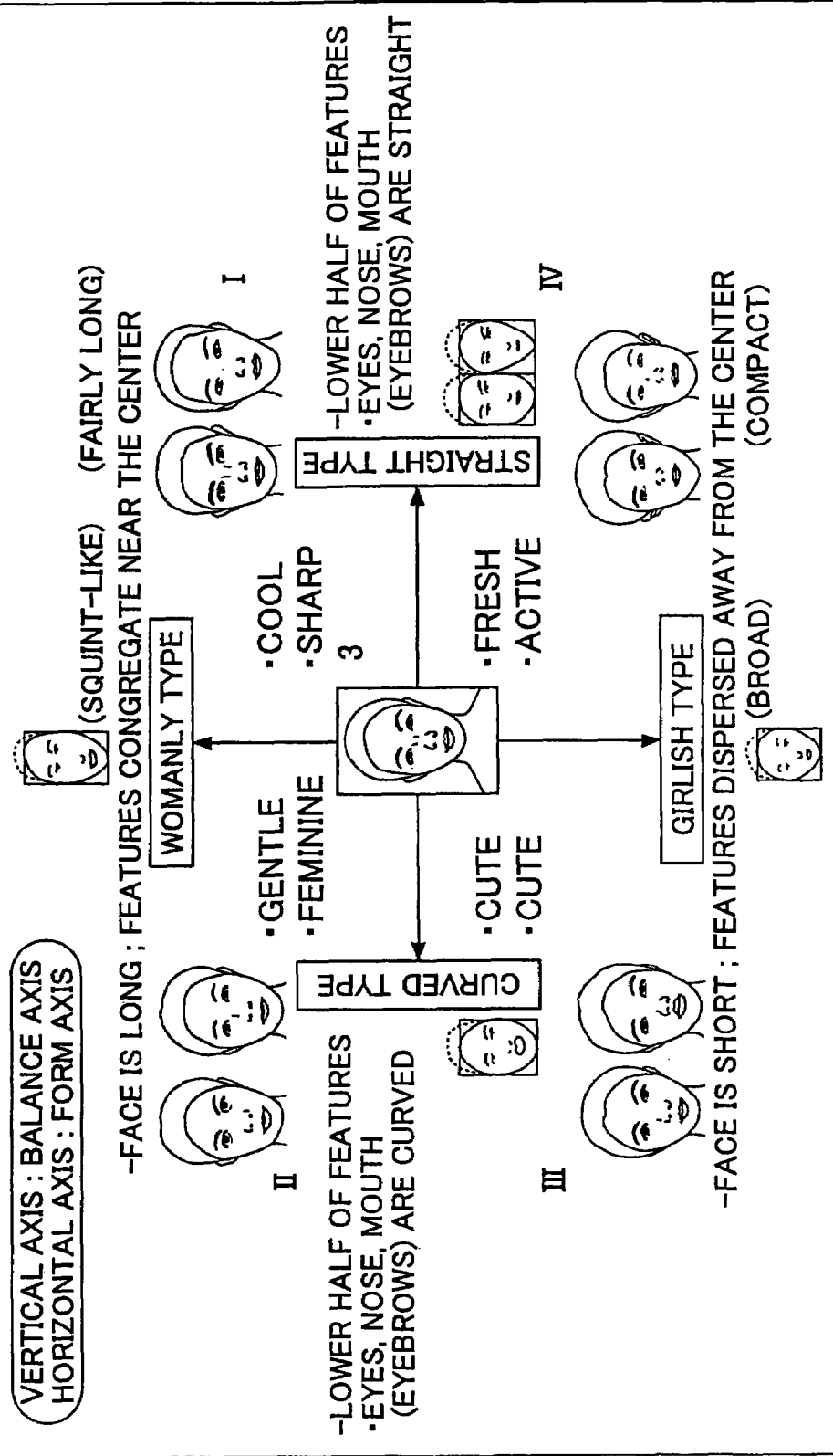
FIG. 1 is a facial map previously proposed by the applicant.
Figure 3:
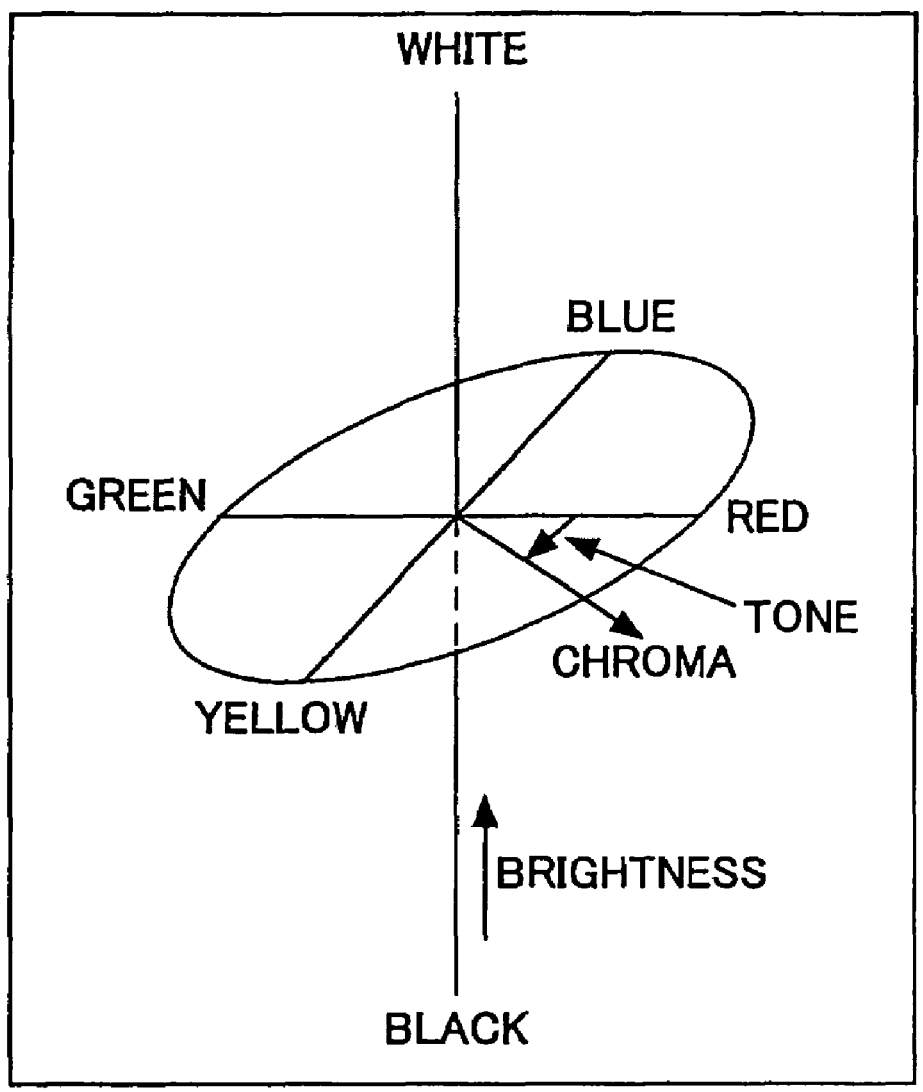
FIG. 3 is a diagram showing a three-dimensional color object obtained by mapping the three color sense perception attributes along three axes.
Figure 4:
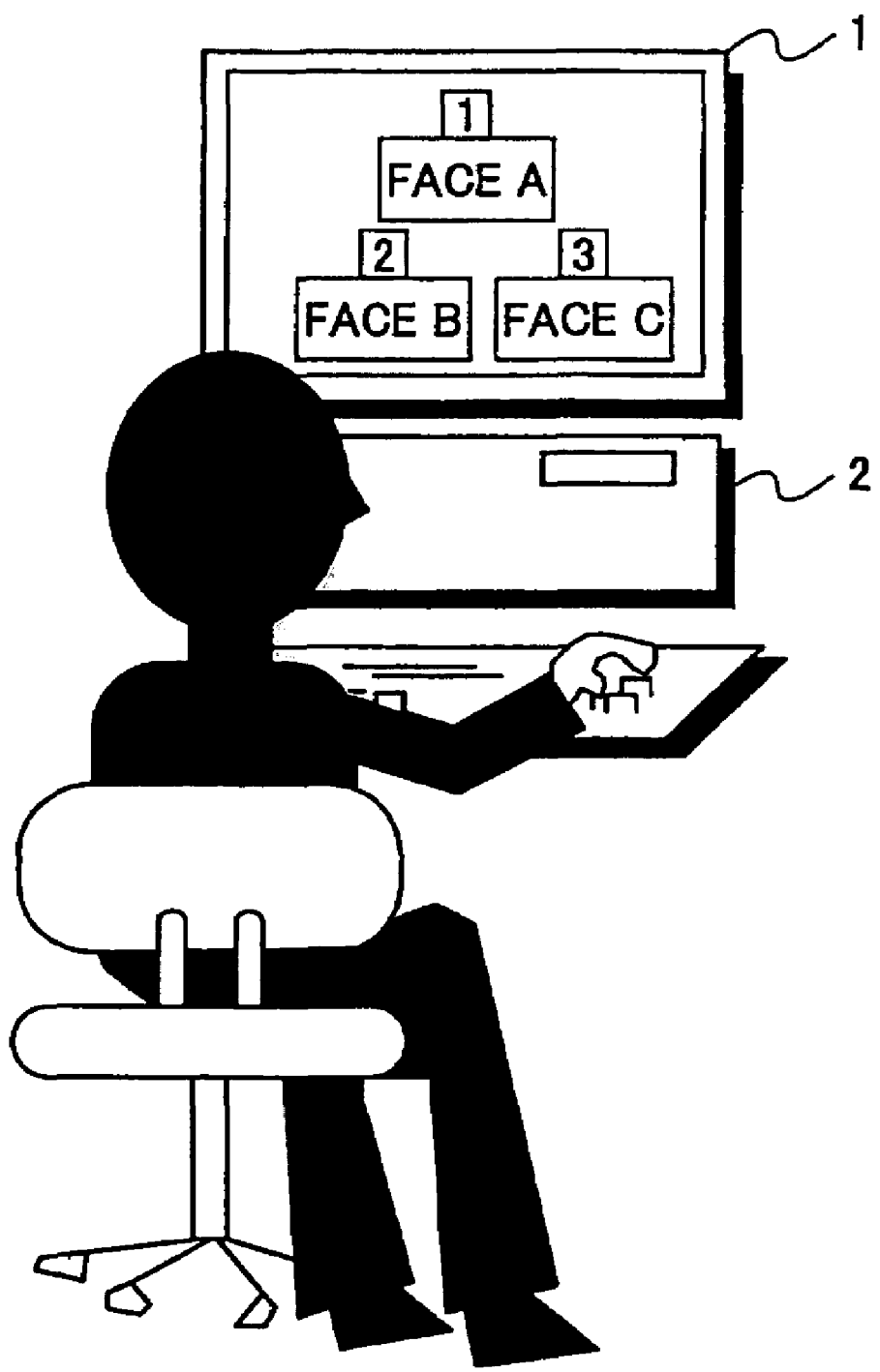
FIG. 4 is a schematic diagram illustrating a state of input/output processing using a computer.
Figure 5:
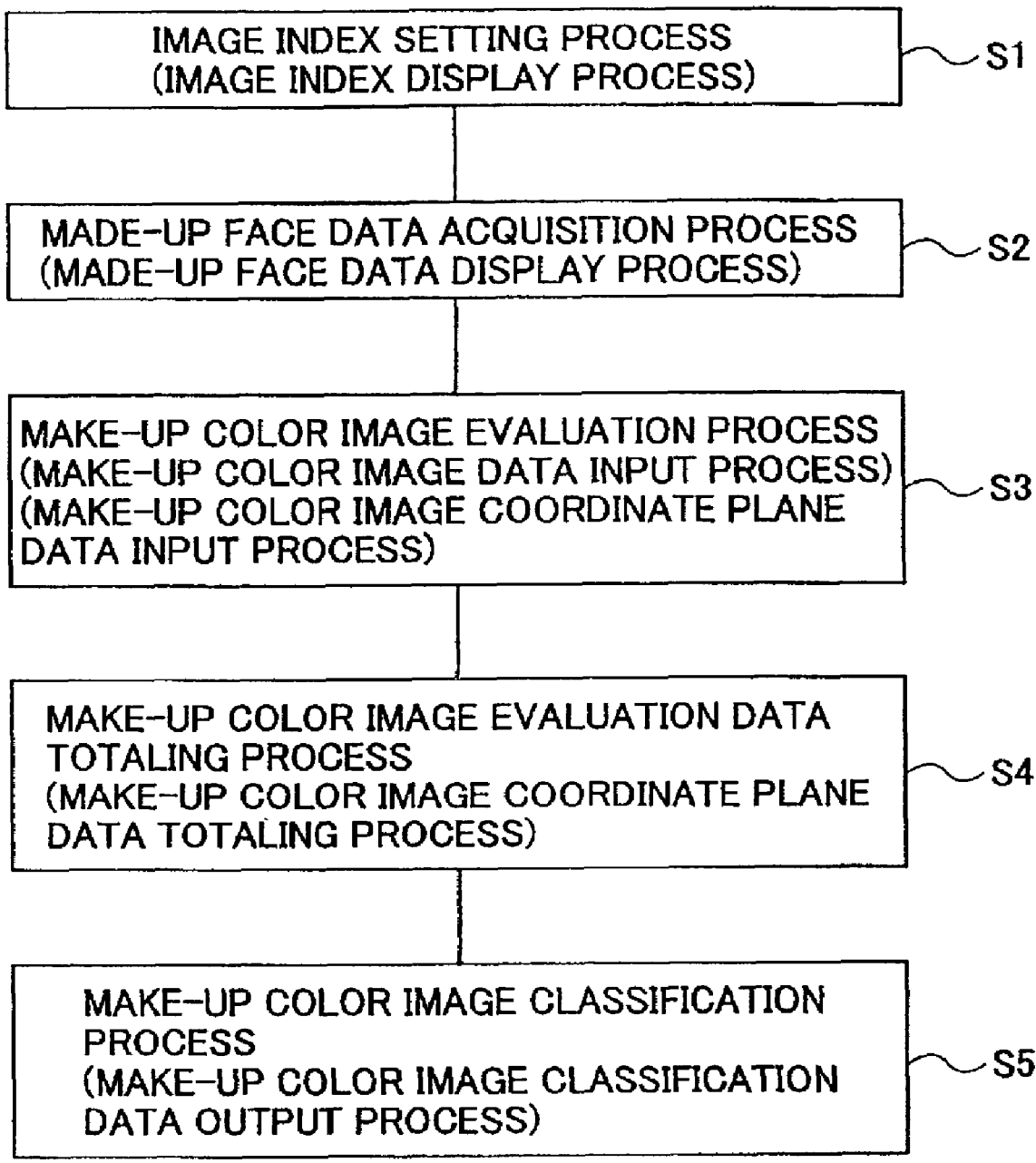
FIG. 5 is a process block diagram for purposes of illustrating steps in a make-up color image classification method according to one embodiment of the present invention.

At this time, as shown in FIG. 4, using a computer, and in the order shown in FIG. 5, a model's face made up with cosmetic materials (made-up face), planar coordinate data, survey input format and so forth were displayed on a monitor display screen 1, data was input from a keyboard 2 and statistically processed and the obtained results were output either on the display screen or in printed form.

Initially, the aforementioned facial map used three models of different types and photographed them using the 28 lip colors and 19 eye colors shown in FIG. 6 and FIG. 7. Then, data on these made-up faces was input into a computer (step S2 in FIG. 5, Made-Up Face Data Acquisition Process, Made-Up Face Data Display Process), and in the following processes displayed as appropriate on the display screen and used. It should be noted that, in each drawing, where the meaning does not accompany the reference symbol, it should be understood that VI stands for violet, RS stands for purplish red (hereinafter called rose), PK stands for pink, RD stands for red, BR stands for brown, OR stands for orange, YE stands for yellow, GY stands for gray, GR stands for green, BL stands for blue, and MN stands for achromatic color.

In other words, for example, for lip color, the tone includes all tones ranging from violet to gray, and the intensity means a wide range from pale to deep.

Then, in the case of the lip color experiment, everything except the mouth was made the same natural color so as to be able to capture just the change in image created by the differences in lip color. Similarly, in the case of the eye color experiment, everything except the eyes was made the same natural color.

Determinations as to color image were made by 30 ordinary women monitors and 31 beauticians. It should be noted that the age distribution of the test subjects was made the same for the ordinary women monitors and the beauticians.

It should be noted that, separate from the above-described process, an image index expressing a color image is prepared, and in this case made into a survey chart evaluation criterion, displayed on the computer display screen, and additionally, an image index coordinate plane map is displayed (step S1 in FIG. 5, Image Index Setting Process (Image Index Display Process).

The criteria used to determine the color image are as shown in the survey chart depicted in FIG. 8. In this case, the messages (text) that describe the color images resembled that used for the facial classification method and facial map investigated previously by the applicant as noted above. They were conceived with the idea of combining, and using for determining, the make-up color image classification method and the make-up color image map of the present invention, and the facial classification method and facial map, so that both classification methods and both maps can be used together to perform effective make-up application. As a result, the two coordinate axes of the color image map described below, that is, the axis of the color image index that is chosen from among and indicates at least one of warm/cool, character and mind (hereinafter as a representative example called the warm/cool axis), and the axis of the color image index that is chosen from among and indicates at least one of light/dignified, mature, immature and mature (hereinafter as a representative example called the light/dignified axis), are identical to the two axes used instead of words to describe the image of the face located within each of four quadrants formed by the balance axis and the form axis of the face map. It should be noted that, in this case, the two axes of the color image map and the facial map need not coincide, that is, the coordinate axes may be rotated, and further, may be set without regard to the many words that express the color image used for the color map, the acquired data analyzed with statistical methods such as the factor analysis used for the facial map, and a new image axis created.

The survey results involve tabulating the number of points acquired for each expression describing a given color image, using 2 points for "Think so" and 1 point for "Sort of think so", and on that basis positioning along the above-described two coordinate axes according to the directionality and the points of the words expressing individual color images of individual colors (step S3 in FIG. 5, the make-up color image evaluation process, the make-up color image data input process, and the make-up color image coordinate plane data input process).

Figure 9:
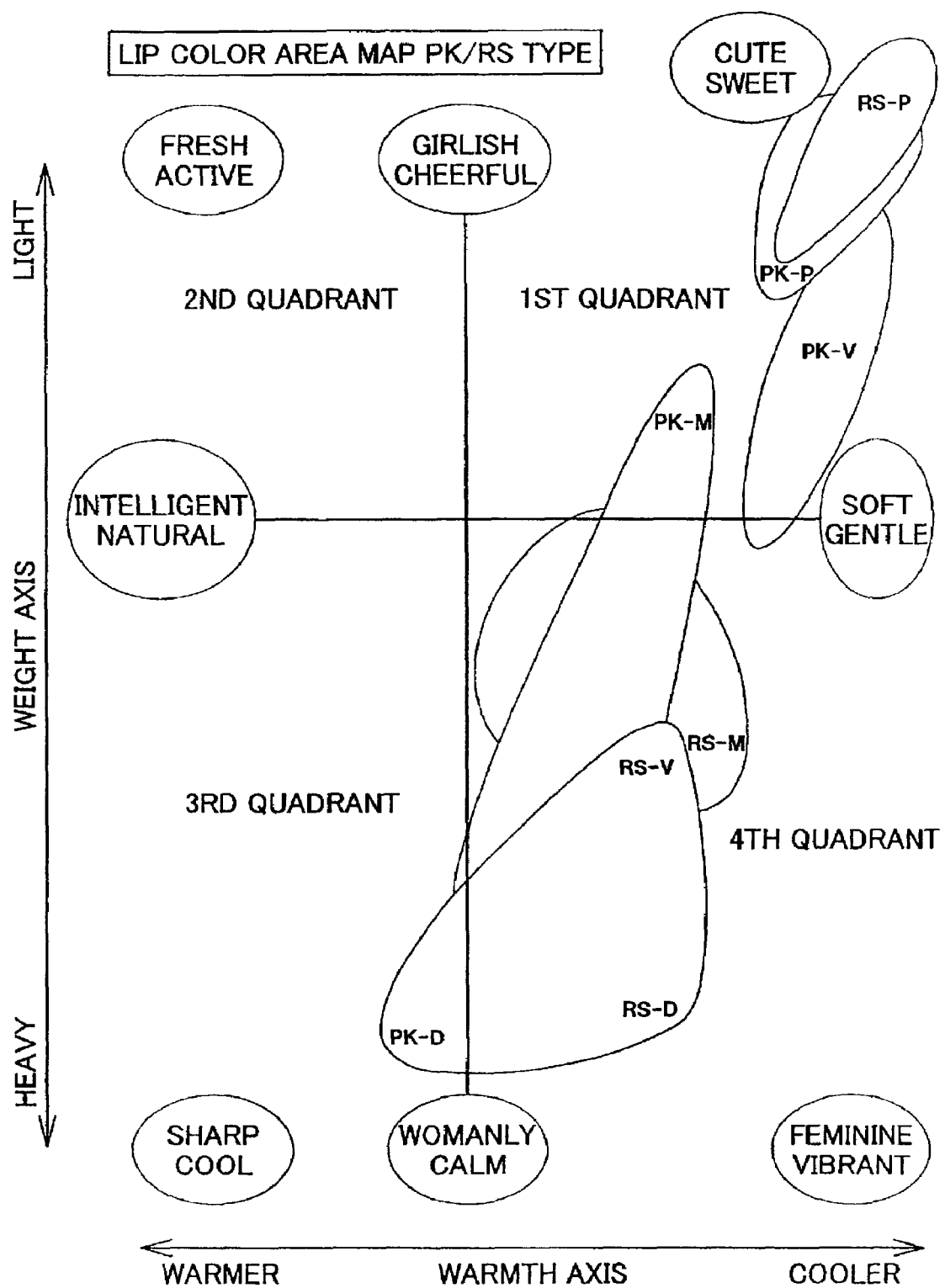
FIG. 9 is a pink/rose group lip color make-up color image map according to one embodiment of the present invention.
Figure 10:
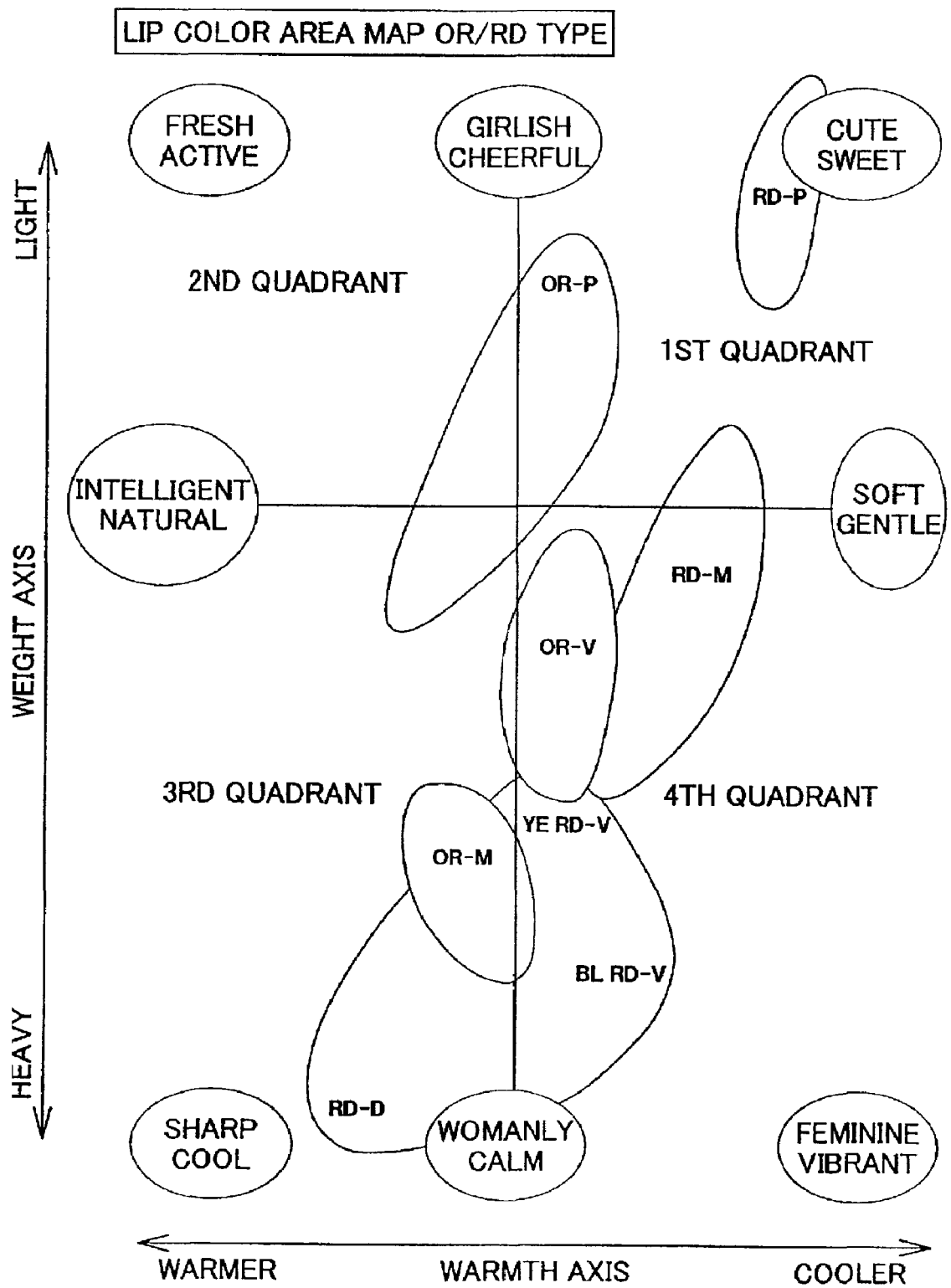
FIG. 10 is an orange/red group lip color make-up color image map according to one embodiment of the present invention.
Figure 11:
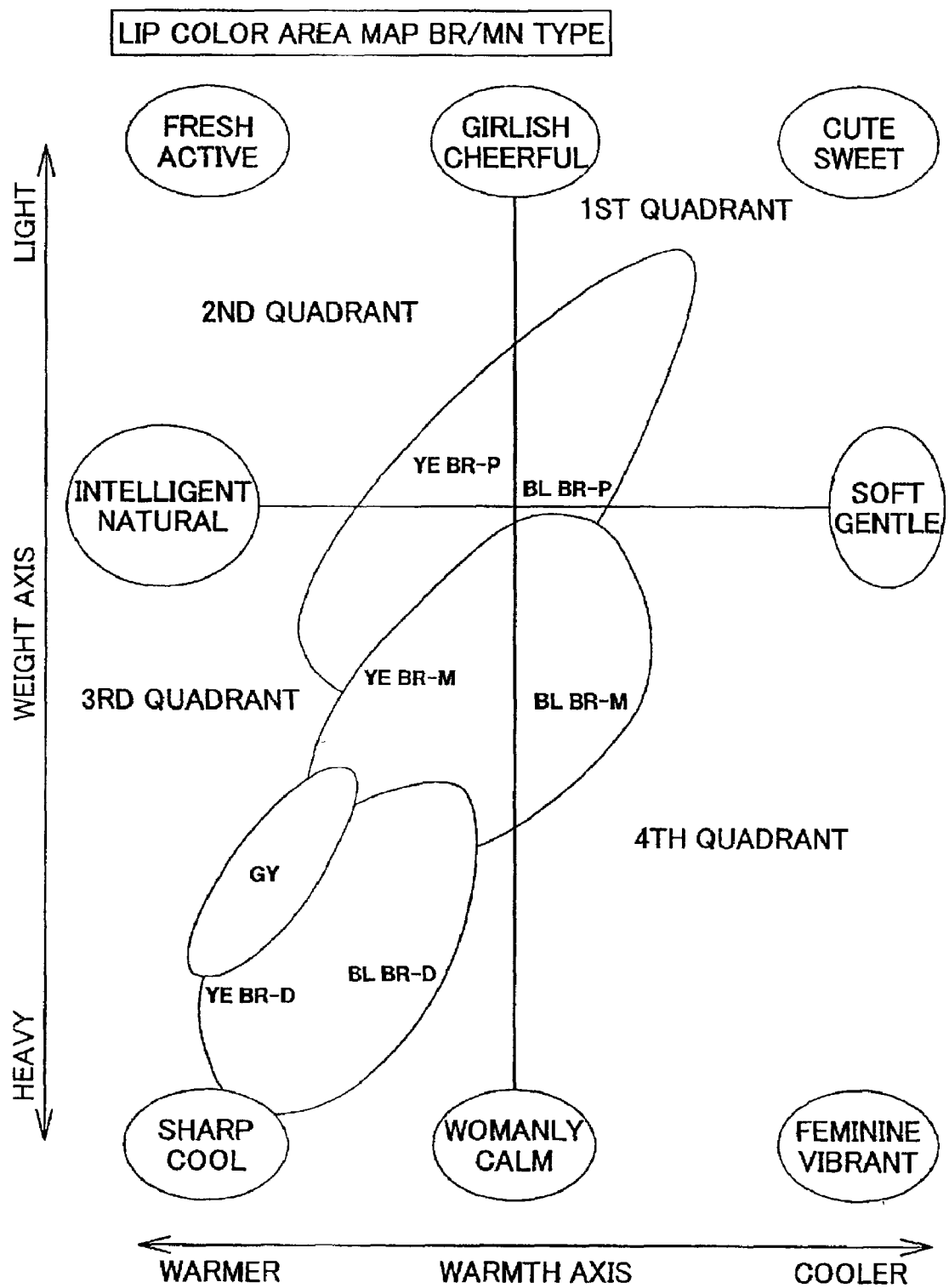
FIG. 11 is a brown/clear group lip color make-up color image map according to one embodiment of the present invention.

FIGS. 9–11 show a make-up color image map for lip color. In this case, the survey results from ordinary women monitors and beauticians were each totaled (step S4 in FIG. 5, make-up color image evaluation data totaling process, make-up color image coordinate plane data totaling process), analyzed, and further, individual analysis results comprehensively analyzed to create a single map (step S5 in FIG. 5, make-up color image classification process, make-up color image classification data output process). It should be noted that, with respect to the former, it is possible to analyze results of surveys of the ordinary women monitors and the beauticians separately, and, looking at the resulting two maps, in the case of the beautician's map, for example, compared to the former, that is, to the map prepared according to the results of the survey of the ordinary women monitors, a difference can be seen also insofar as individual colors are distributed widely in the direction of the horizontal axis (the warmth axis), and meaningful results can be obtained by producing and using the two maps. However, when the make-up color image map of the present invention is actually used to apply make-up, it is thought that evaluating all the data comprehensively, and displaying and giving a certain amount of width to a zone for each individual color on the map, and providing a degree of freedom in the choice of color is practical.

The purpose of dividing among the three shown in FIGS. 9–11 is, as described above, to give each individual color a wide zone of expression, an attempt which would lead to the inconvenience of having multiple color zones overlapping if all colors were displayed on a single map.

Looking at the pink/rose type map of FIG. 9 that contains red and blue, from the first quadrant (for example, a zone locating the cute image) to the fourth quadrant (for example, the zone locating the feminine image), it can be seen that pale colors and light colors belong to the first quadrant, and that dark colors and clear colors belong to the fourth quadrant.

Looking at the orange/red type map of FIG. 10, it can be seen that the color distribution is to the left as compared to the pink/rose type, that is, has shifted toward the center of the map and elongated vertically.

Looking at the brown/gray type map of FIG. 11, which has little red, it can be seen that the color distribution has shifted further to the left as compared to the orange/red type, and elongated further vertically, with a strong silver image in the third quadrant (for example, the zone locating the sharp image).

Figure 12:
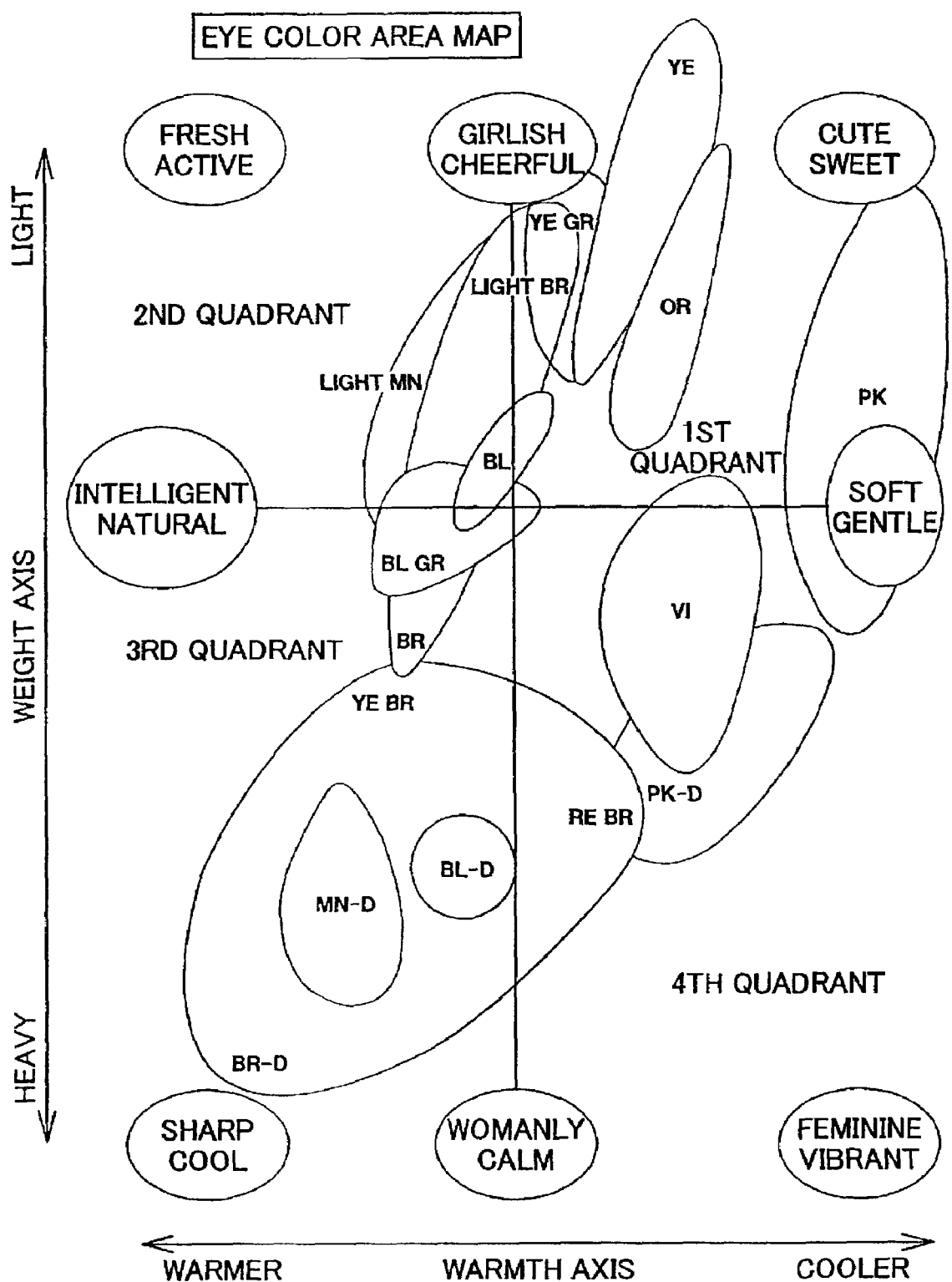
FIG. 12 is a make-up color image map of eye color according to an embodiment of the present invention.

FIG. 12 is a make-up color image for eye color. In this case also, data is analyzed and collected according to the same steps as those for the lip color described above, with a zone displayed for each individual color.

Looking at FIG. 12, it can be seen that vivacious, bright colors such as yellow are located in the first quadrant (the zone that locates the cute image); off-white colors such as light achromatic colors and brown are located in the second quadrant (for example, the zone that locates the fresh image); colors with little or no red such as brown and dark achromatic colors and black are located in the third quadrant (the zone that locates sharp images); and colors with an appropriate amount of red such as dark pink and violet, and in particular, colors containing blue, are located in the fourth quadrant (the zone that locates the feminine image). By contrast, blue and blue-green are located largely in the center.

At any rate, the make-up color image map for the eye color and the make-up color image map for the lip color can be said to be show virtually identical tendencies.

It should be noted that these results, when viewed from the standpoint of chromatics, indicate that blue is a cool type of color, that is, a calm color that gives a feeling of coolness, and for this reason it may be thought appropriate to locate it at the left side of the map, in the second and third quadrants. However, as a make-up color image on the map, the color blue is located virtually in the center of the drawing. This is because the color of the skin always exists in the background of the making up of the eye and the making up of the lip. That is, the color of orange skin darkened with blue is a complementary color scheme in chromatics and blue is a color that stands out against the color of the skin, so it would appear that the make-up color image it projects, together with the usual fresh, cool image that is the basic image of blue, the cute, vibrant reverse image as well. That is, bluish colors have the ability to provide a variety of images with just minor changes in tone and feeling, and on this point, the color image at make-up and the color image in chromatics can sometimes differ dramatically.

Figure 13:
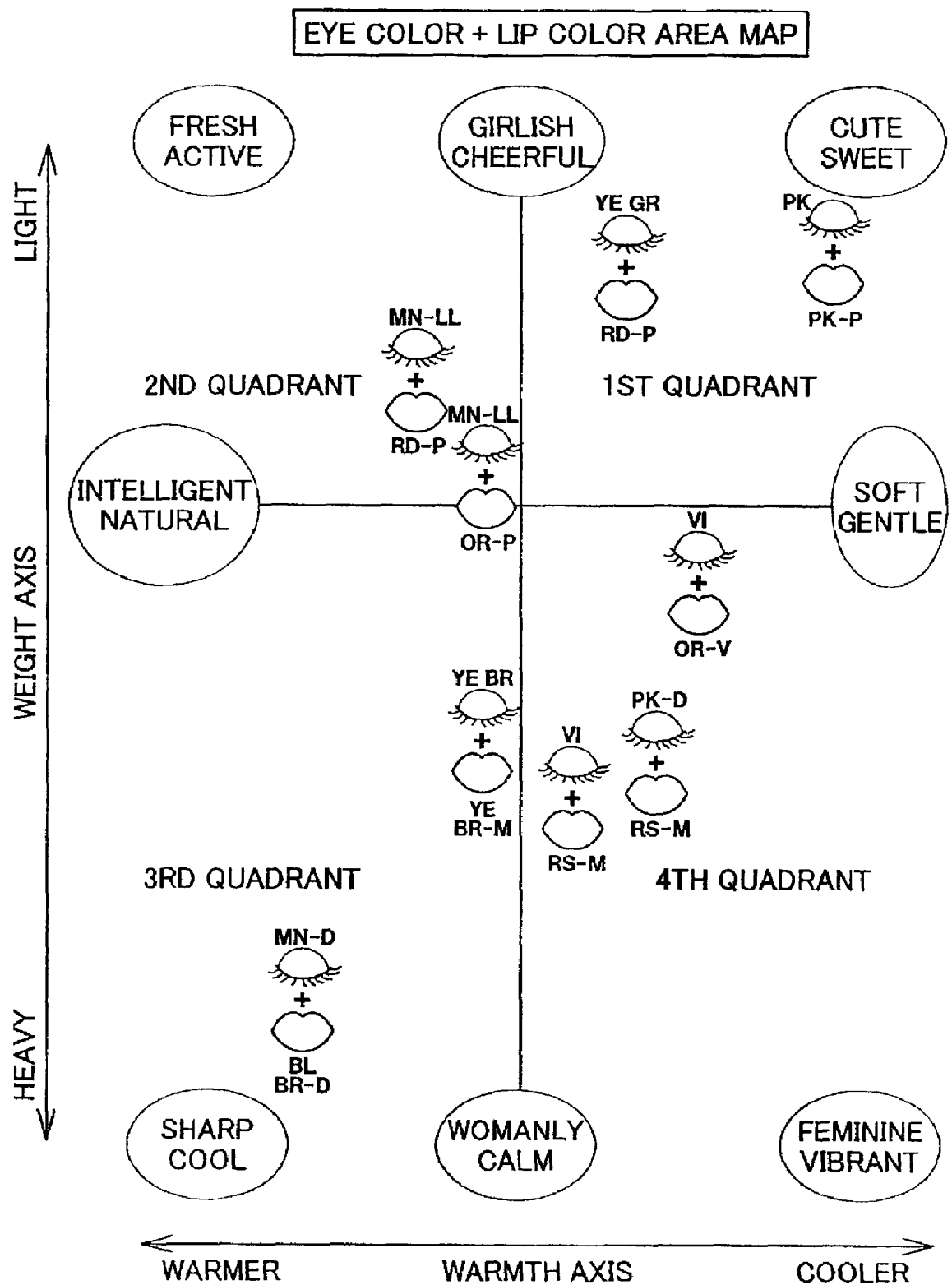
FIG. 13 is a make-up color image map of a combination of lip color and eye color according to an embodiment of the present invention.

Next, an experiment was conducted on color images produced by combining the lip color and the eye color as mapped above, with only the results shown in FIG. 13.

Looking at FIG. 13, a combination of pink eye color and pale pink lip color is located in the first quadrant (the zone that locates the cute image); a combination of pale white eye color and pale orange lip color is located in the second quadrant (the zone that locates the fresh image); a combination of dark achromatic eye color and dark brown lip color is located in the third quadrant (the zone that locates the sharp image); and a combination of dark pinkish eye color and moderate rose lip color is located in the fourth quadrant (the zone that locates the feminine image).

This, practically, means that, when used with combinations of lip color and eye color positioned in the same quadrants of the respective maps, the image of that quadrant can be expressed for the face as a whole.

Figure 14:
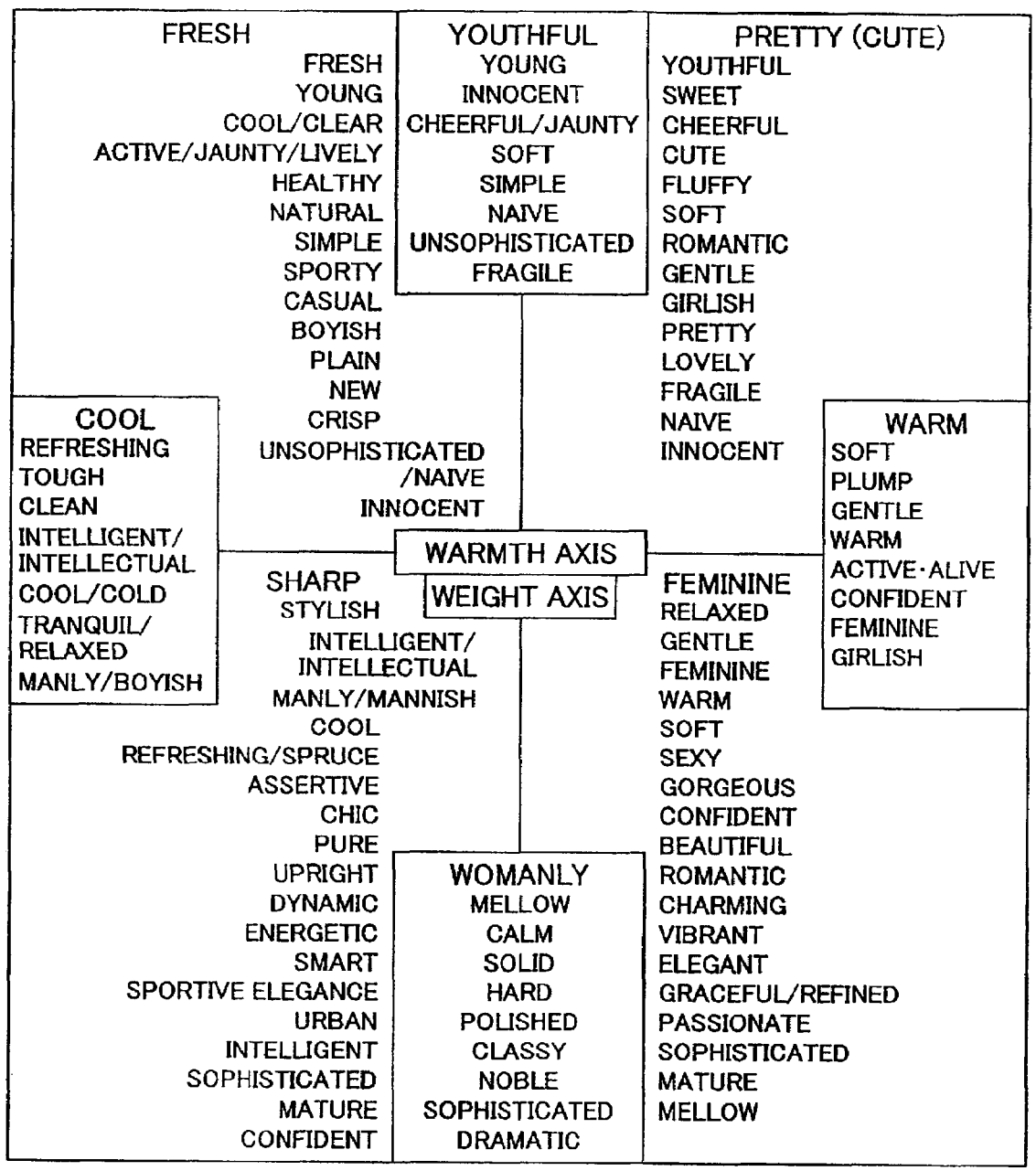
FIG. 14 is a map showing representative image terms located in each quadrant of a make-up color image map of lip color and eye color as well as a facial map according to an embodiment of the present invention.

It should be noted that, the representative color image located in the individual quadrants formed by each of the above-described axes are displayed in further detail in FIG. 14. By comparing and contrasting this FIG. 14 with FIGS. 9–13 and referring thereto, the color image can be grasped easily and accurately, making it possible to apply make-up effectively.

As described above, the make-up color image classification method and the make-up color image map of the present invention are of course useful when applying either lip color or eye color singly or in combination, and further, can make the application of make-up even more effective when used in combination with the facial classification method and facial map.

For example, by providing a computer at cosmetics stores, each individual customer can visually subjectively imagine a make-up image color using a made-up face photograph combining cosmetic make-up, and further, cosmeticians are able to provide customers with reliable advice on the best way to apply make-up based on a wide range of objective information obtained by displaying the make-up color image on a display screen and by using this make-up color image map.

What is claimed is:

1. A make-up color image classification method for classifying at least one or the other of either a lip color or an eye color using a color image index chosen from among, and indicating at least one of, warm/cool, character, mind as well as a color image index chosen from among, and indicating at least one of, light/dignified, mature/immature, mature, obtained from applying color to skin.

2. The make-up color image classification method as claimed in claim 1, taking as coordinate axes and classifying two-dimensionally the color image index chosen from among and indicating at least one of warm/cool, character, mind and the color image index chosen from among and indicating at least one of light/dignified, mature/immature, mature.

3. A make-up color image classification method comprising:
   an image index selling step for setting either an image index chosen from among and indicating at least one of warm/cool, character and mind or an image index chosen from among and indicating at least one of light/dignified, mature/immature and mature;
   a made-up face data acquisition step for acquiring made-up face data for a plurality of types of make-up material for at least one of lip color and eye color applied to a face;
   a make-up color image evaluation step, in which a plurality of test subjects evaluate a color image of the make-up material based on the made-up face data using the image index as an evaluation criteria; and
   a make-up color image classification step for classifying the make-up material based on the obtained make-up material color image using the image index.

4. A make-up color image classification method comprising:
   an image index setting step for setting an image index chosen from among and indicating at least one of warm/cool, character and mind and another image index chosen from among and indicating at least one of light/dignified, mature/immature and mature as two coordinate axes;
   a made-up face data acquisition step for acquiring made-up face data for a plurality of types of make-up material for at least one of lip color and eye color applied to a face;
   a make-up color image evaluation step, in which a plurality of test subjects evaluate a color image of the make-up material based on the made-up face data using the two image indexes as an evaluation criteria; and
   a make-up color image classification step for two-dimensionally classifying the make-up material based on the obtained make-up material color image using the two image indexes as coordinate axes.

5. A make-up color image classification method for classifying make-up material based on color image data collected and analyzed using a computer, comprising:
   an image index display step for setting, inputting and displaying either an image index chosen from among and indicating at least one of warm/cool, character and mind or an image index chosen from among and indicating at least one of light/dignified, mature/immature and mature;
   a made-up face data display step for inputting and displaying made-up face data for a plurality of types of make-up material for at least one of lip color and eye color applied to a face;
   a make-up color image evaluation input step for evaluating a color image of the make-up material based on the made-up face data using the image index as an evaluation criteria and inputting grading data;
   a make-up color image evaluation data totaling step for adding up grading data input by a plurality of people; and
   a make-up color image classification data output step for statistically processing the totaled grading data and outputting results of a positioning of a plurality of types of make-up materials in relation to an image index.

6. A make-up color image classification method for classifying make-up material based on color image data collected and analyzed using a computer, comprising:
- an image index display step for setting, inputting and displaying an image index chosen from among and indicating at least one of warm/cool, character and mind as well as an image index chosen from among and indicating at least one of light/dignified, mature/immature and mature;
- a made-up face data display step for inputting and displaying made-up face data for a plurality of types of make-up material for at least one of lip color and eye color applied to a face;
- a make-up color image coordinate plane data input step for evaluating a color image of the make-up material based on the made-up face data using the image index as an evaluation criteria and inputting coordinates;
- a make-up color image coordinate plane data totaling step for adding up grading data input by a plurality of people; and
- a make-up color image classification data output step for statistically processing the totaled coordinate plane point data end outputting a coordinate plane map indicating a position of a plurality of types of make-up materials.

* * * * *